United States Patent
Ha

(10) Patent No.: US 11,415,548 B2
(45) Date of Patent: Aug. 16, 2022

(54) FLAT TYPE LAMP FOR PHOTOIONIZATION DETECTOR AND METHOD FOR MANUFACTURING THE SAME

(71) Applicant: SENKO Co, Ltd, Gyeonggi-do (KR)

(72) Inventor: Seung Chul Ha, Gyeonggi-do (KR)

(73) Assignee: SENKO CO, LTD, Gyeonggi-do (KR)

( * ) Notice: Subject to any disclaimer, the term of this patent is extended or adjusted under 35 U.S.C. 154(b) by 387 days.

(21) Appl. No.: 16/728,693

(22) Filed: Dec. 27, 2019

(65) Prior Publication Data

US 2020/0326305 A1    Oct. 15, 2020

(30) Foreign Application Priority Data

Apr. 11, 2019   (KR) .................. 10-2019-0042263

(51) Int. Cl.
  *G01N 27/64* (2006.01)
  *G01N 27/68* (2006.01)
  *H01J 61/09* (2006.01)
  *H01H 9/14* (2006.01)

(52) U.S. Cl.
  CPC ............. *G01N 27/68* (2013.01); *G01N 27/64* (2013.01); *H01H 9/14* (2013.01); *H01J 61/09* (2013.01)

(58) Field of Classification Search
  CPC .......... G01N 27/64; G01N 27/68; H01H 9/14; H01J 61/09
  See application file for complete search history.

(56) References Cited

U.S. PATENT DOCUMENTS

| 2004/0227469 | A1* | 11/2004 | Schoenbach | H01J 61/82 315/59 |
| 2015/0253286 | A1* | 9/2015 | Shinada | G01N 27/68 324/464 |
| 2019/0214244 | A1* | 7/2019 | Park | H01J 11/18 |

FOREIGN PATENT DOCUMENTS

| JP | 2001222974 A | 8/2001 | |
| KR | 10-2006-0027126 A | 3/2006 | |
| KR | 10-2008-0057884 A | 6/2008 | |
| KR | 10-2009-0041126 A | 4/2009 | |
| WO | WO-2013170431 A1 * | 11/2013 | ........... H01J 61/307 |
| WO | WO-2018004507 A1 * | 1/2018 | ............... A61L 2/10 |

* cited by examiner

*Primary Examiner* — Mark R Gaworecki

(74) *Attorney, Agent, or Firm* — Harness, Dickey & Pierce, P.L.C.

(57) ABSTRACT

A disclosed flat type lamp for a photoionization detector includes: a first plate member having a plate shape and having a first surface on which a plurality of discharge cavities is formed; a second plate member isolating the plurality of discharge cavities from the outside by being disposed and sealed on the first surface of the first plate member; electrodes disposed on the first and second plate members and arranged to face each other; and a discharge gas filled in the plurality of discharge cavities and producing vacuum ultraviolet using electric force that is applied through the electrodes.

9 Claims, 5 Drawing Sheets

FLAT TYPE LAMP FOR PHOTOIONIZATION DETECTOR AND METHOD FOR MANUFACTURING THE SAME

CROSS-REFERENCE TO RELATED APPLICATIONS

This application claims the priority of Korean Patent Application No. 10-2019-0042263 filed on Apr. 11, 2019, in the Korean Intellectual Property Office, the disclosure of which is incorporated herein by reference.

FIELD

The present disclosure relates to a flat type lamp for a photoionization detector and a method for manufacturing the same and, more particularly, to a flat type lamp for a photoionization detector that is easy to increase or decrease in size, can be massively produced with a uniform characteristic, and can radiate vacuum ultraviolet for photoionization from a wide surface when being applied to a photoionization sensor, thereby being able to increase an ionization cross-sectional area of a measurement gas and improve sensitivity, and a method of manufacturing the same.

BACKGROUND

This section provides background information related to the present disclosure which is not necessarily prior art.

A photoionization phenomenon that is a kind of photoelectric effect in which an atom absorbing a photon emits an electron when light having a frequency over a predetermined level is given uses ionized atoms, so when an atom is ionized by the photoionization phenomenon, the atom can be electrically easily detected. That is, it is possible to detect specific substances by configuring an electric circuit using ionized atomic nuclei or electrons.

A photoionization detector (hereafter, referred to as a PID) uses such a photoionization phenomenon and a lamp for the PID that generates light that ionizes atoms is the most important key part.

Common lamps for a PID has a structure in which a glass-made sealed tube is filled with discharge gas, in which the discharge gas is excited to a DC (direct current) or an RF (radio frequency).

The wavelength of emitted light varies depending on the kinds of discharge gases, and common lamps for a PID emit vacuum ultraviolet (VUV) having a sufficiently higher wavelength of 10 nm~200 nm than the ionization energy of substances to be detected.

The lamps for a PID in the related art are manufactured by evacuating a glass tube structure, filling a discharge gas in the glass tube structure in the state, and then thermally bonding a glass tube.

Due to this manufacturing method, the lamps for a PID in the related art are manufactured individually one by one, so mass production is difficult, and it is also difficult to maintain a uniform characteristic.

Further, since the sizes of the lamps for a PID in the related art are limited to the diameter of a tube, there is a problem that there is a limit in changing the sizes. In particular, there is a limit in reducing the diameter of the tube to evacuating the tube and injecting a discharge gas.

Further, since the lamps for a PID in the related art actually cannot radiate vacuum ultraviolet for photoionization from a wide surface when they are applied to a photoionization sensor, there is a limit in increasing the sensitivity of photoionization sensors.

SUMMARY OF THE INVENTION

An aspect of the present disclosure provides a flat type lamp for a photoionization detector that is easy to increase or decrease in size and can be massively produced with a uniform characteristic, and a method for manufacturing the flat type lamp.

An aspect of the present disclosure also provides a flat type lamp for a photoionization detector that can radiate vacuum ultraviolet for photoionization from a large surface to be able to improve sensitivity by increasing an ionization cross-sectional area of a measurement gas when being applied to a photoionization sensor, and a method for manufacturing the flat type lamp.

This section provides a general summary of the disclosure and is not a comprehensive disclosure of its full scope or all of its features.

According to an aspect of the present disclosure, there is provided a flat type lamp for a photoionization detector, the flat type lamp including: a first plate member having a plate shape and having a first surface on which a plurality of discharge cavities is formed; a second plate member isolating the plurality of discharge cavities from the outside by being disposed and sealed on the first surface of the first plate member; electrodes disposed on the first and second plate members and arranged to face each other; and a discharge gas filled in the plurality of discharge cavities and producing vacuum ultraviolet using electric force that is applied through the electrodes.

According to another aspect of the present disclosure, there is provided a method of manufacturing the flat type lamp for a photoionization detector, the method including: preparing the first and second plate members (S10); forming the electrodes on the first and second plate members to face each other with the plurality of discharge cavities therebetween (S20); forming the plurality of discharge cavities on the first surface of the first plate member (S30); forming the sealing materials for sealing with the second plate member on the first surface of the first plate member except for inner sides of the plurality of discharge cavities (S40); putting and stacking the first and second plate members in the chamber having an internal space that can be selectively isolated from the outside (S50); isolating the internal space of the chamber from the outside and evacuating the internal space (S60); making the internal space into a discharge gas atmosphere by supplying the discharge gas into the internal space (S70); and sealing the plurality of discharge cavities from the outside by hardening the sealing materials (S80).

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Hereafter, embodiments of a flat type lamp for a photoionization detector according to the present disclosure and a method of manufacturing the flat type lamp are described in detail with reference to the drawings.

However, it should be noted that the intrinsic spirit of the present disclosure should not be construed as being limited to embodiments to be described hereafter and includes a range easily proposed by replacing or changing embodiments to be described below by those skilled in the art on the basis of the intrinsic spirit of the present disclosure.

Further, the terms to be used hereafter are selected for the convenience of description and should be appropriately construed as meanings coinciding with the intrinsic spirit of the present disclosure, not being limited to the meanings in dictionaries when finding out the spirit of the present disclosure.

Figure 1:
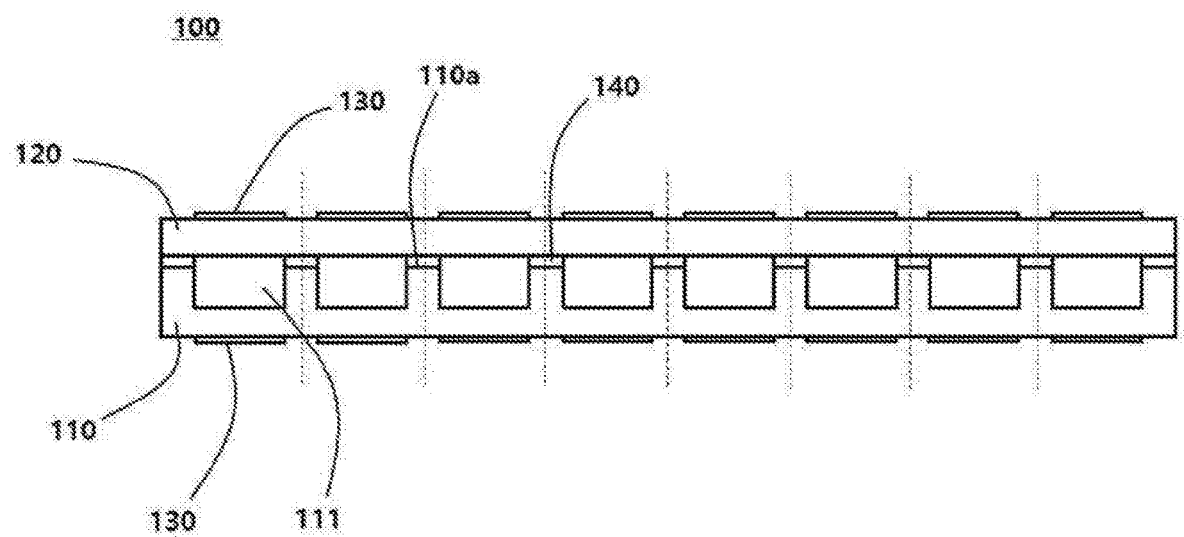
FIG. 1 is a view showing an embodiment of a flat type lamp for a photoionization detector according to the present disclosure.

FIG. 1 is a view showing an embodiment of a flat type lamp for a photoionization detector according to the present disclosure.

Referring to FIG. 1, a flat type lamp 100 for a photoionization detector according to the present disclosure includes first and second plate members 110 and 120, a plurality of discharging cavities 111, electrodes 130, and a discharge gas.

The first and second plate members 110 and 120 are provided in plate shapes and any materials can be used as long as they can transmit vacuum ultraviolet (e.g., glass, $MgF_2$).

The first plate member 110 has a plurality of discharge cavities 111 formed on a first surface 110a.

The plurality of discharge cavities 111 is recessed in the thickness direction of the first plate member 110 from the first surface 110a of the first plate member 110.

The plurality of discharge cavities 111 is not limited in shape if they are separated, but it is preferable that they are arranged in a lattice shape to improve the degree of integration.

The plurality of discharge cavities 111 has groove shapes formed by removing a portion of the first plate member 110, and as the method of forming them, chemical etching or physical etching such as sandblasting may be applied.

The plurality of discharge cavities 111 is isolated from the outside by the second plate member 120 disposed and sealed on the first surface 110a of the first plate member 110.

In this case, sealing means hermetic sealing.

Further, a sealing material 140 (e.g., ultraviolet resin, frit, bonding metal) is applied or deposited on the first and second plate members 110 and 120 for sealing, a laser, an RF, a microwave, and IR lamp are used for temporal bonding, and the degree of sealing is improved through bonding enhancement.

Meanwhile, the electrodes 130 are disposed on each of the first and second plate members 110 and 120 and are arranged to face each other with the plurality of discharge cavities 111 therebetween. The electrodes 130 may be formed by deposition.

The discharge gas is filled in a discharge space formed by the plurality of discharge cavities 111 and the second plate member 120 and is inert gas (e.g., Xe, Kr) that produces vacuum ultraviolet using electric force that is applied through the electrodes 130.

In this embodiment, the discharge gas is filled in the plurality of discharge cavities 111 in the process of bonding the first plate member 110 having the plurality of discharge cavities 111 and the second plate member 120.

Accordingly, there is an advantage that there is no need to form filling holes in the first and second plate members 110 and 120 or form a glass pipe for filing in order to fill the plurality of discharge cavities 111 with the discharge gas. Further, the concentration of the discharge gas filled in the plurality of discharge cavities 111 is uniform, so it is possible to manufacture a plurality of lamps having the same discharge characteristic.

This can be achieved by bonding the first and second plate members 110 and 120 in a chamber that is in a discharge gas atmosphere.

In detail, the first and second plate members 110 and 120 are put into a chamber 160 isolated from the outside and filled with a discharge gas, the chamber 160 is evacuated, a discharge gas is injected into the chamber 160 so that the first and second plate members 110 and 120 come into a discharge gas atmosphere, and then the second plate member 120 is bonded to the first plate member 110.

In this process, the discharge gas is uniformly injected into the plurality of discharge cavities 111 simultaneously when the second plate member 120 is bonded to the first plate member 110.

On the other hand, in this embodiment, the plurality of discharge cavities 111 is sealed not to communicate with each other by the second plate member 120. Accordingly, the lamp 100 can be individualized by cutting the first and second plate members 110 and 120.

The individualized lamp 100 may include one or several discharge cavities 111, depending on the shape of a photoionization sensor or necessity of a designer.

Meanwhile, in this embodiment, all or some of the plurality of discharge cavities 111 may communicate with each other with the first and second plate members 110 and 120 sealed.

This can be achieved by slightly reducing the heights of the wall separating the plurality of discharge cavities 111 in the process of forming the plurality of discharge cavities 111.

Accordingly, there is the advantage that it is possible to keep the concentration of the discharge gas filled in the individualized plurality of discharge cavities 111 uniform.

Figure 2:
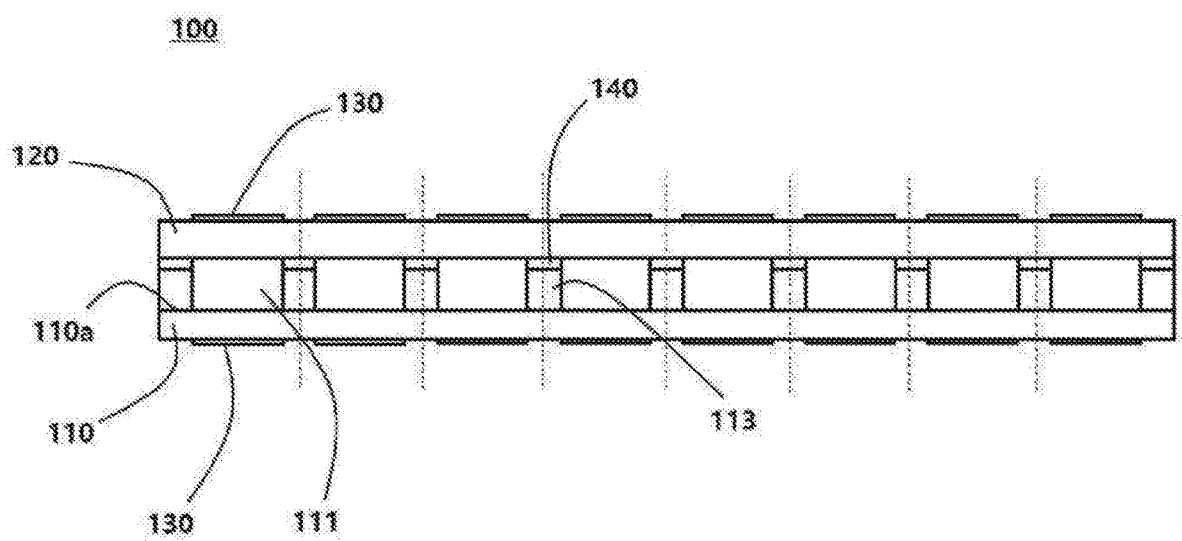
FIG. 2 is a view showing a modified example of FIG. 1.

FIG. 2 is a view showing a modified example of FIG. 1.

Referring to FIG. 2, a flat type lamp 100 for a photoionization detector according to this embodiment is the same as the embodiment described above except that there are provided spacers 113 for forming the plurality of discharge cavities 111.

The spacers 113, which are parts bonded to the first surface 110a of the first plate member 110, divide the first surface into a plurality of regions.

Accordingly, there is a difference from the previous embodiment in which the first plate member 110 is partially removed to form the plurality of discharge cavities 111.

Figure 3:
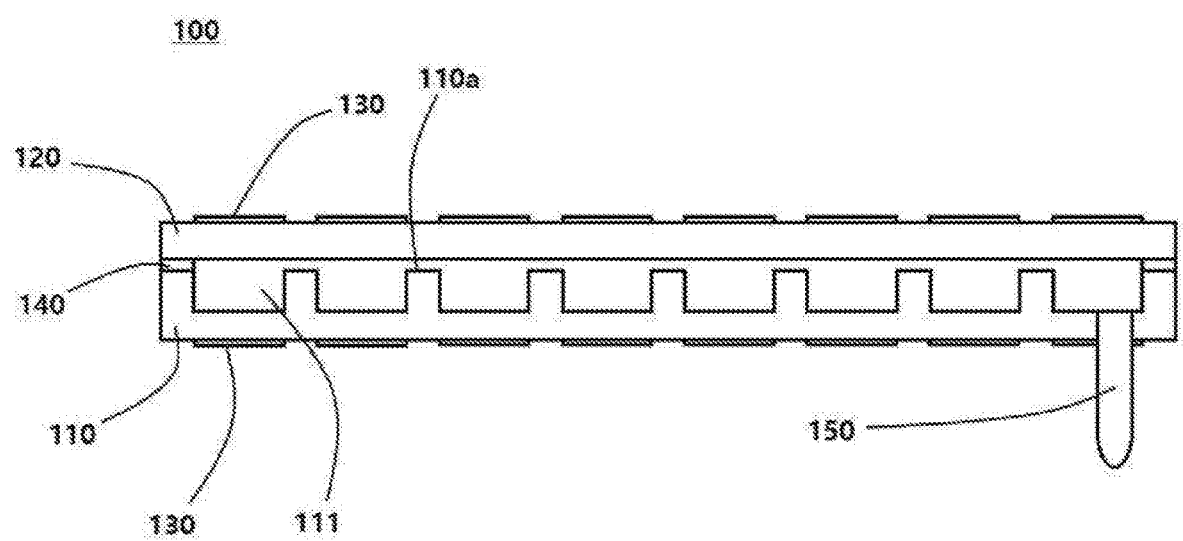
FIG. 3 is a view showing another modified example of FIG. 1.

FIG. 3 is a view showing another modified example of FIG. 1.

Referring to FIG. 3, this embodiment is the same as the previous embodiments except that there provides a filling-injection pipe 150 that communicates with the plurality of discharge cavities 111 to fill the plurality of discharge cavities 111 with a discharge gas.

The filling-injection pipe 150 extends from sides of the first and second plate members 110 and 120 and is integrally made of the same material as the first and second plate members 110 and 120. Further, the filling-injection pipe 150 has a side communicating with the plurality of discharge cavities 111 and the other side connected to a device for evacuation and discharge gas supply.

Accordingly, it is required to seal the end of the filling-injection pipe 150 when finishing filling the plurality of discharge cavities 111 with a discharge gas.

Further, the plurality of discharge cavities 111 communicates with each other.

It is also possible to divide the plurality of discharge cavities 111 into groups such that the groups communicate with each other by providing a plurality of filling-injection pipes 150.

According to this embodiment, upsizing or downsizing is easy, massive production with a uniform characteristic is possible, and vacuum ultraviolet for photoionization can be radiated from a wide surface when the embodiment is applied to a photoionization sensor, so there is an advantage that it is possible to improve sensitivity by increasing the ionization cross-sectional area of a measurement gas.

Figure 4:
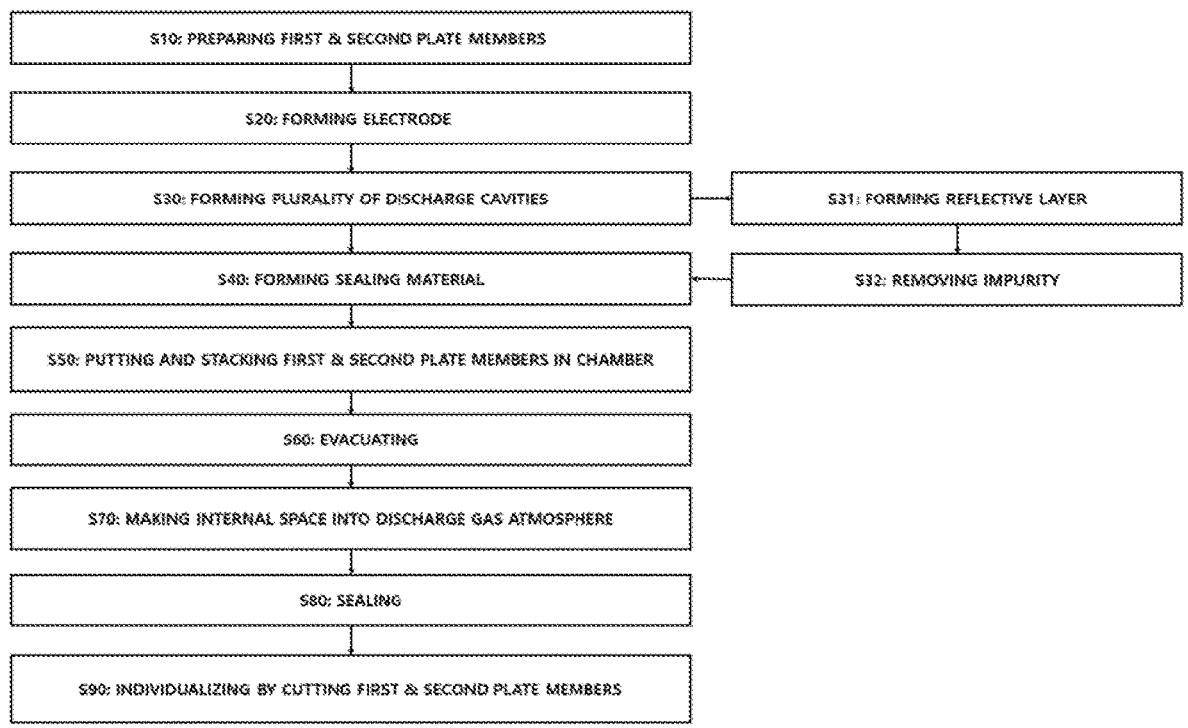
FIG. 4 is a view showing an embodiment of a method of manufacturing a flat type lamp for a photoionization detector according to the present disclosure.
Figure 5:
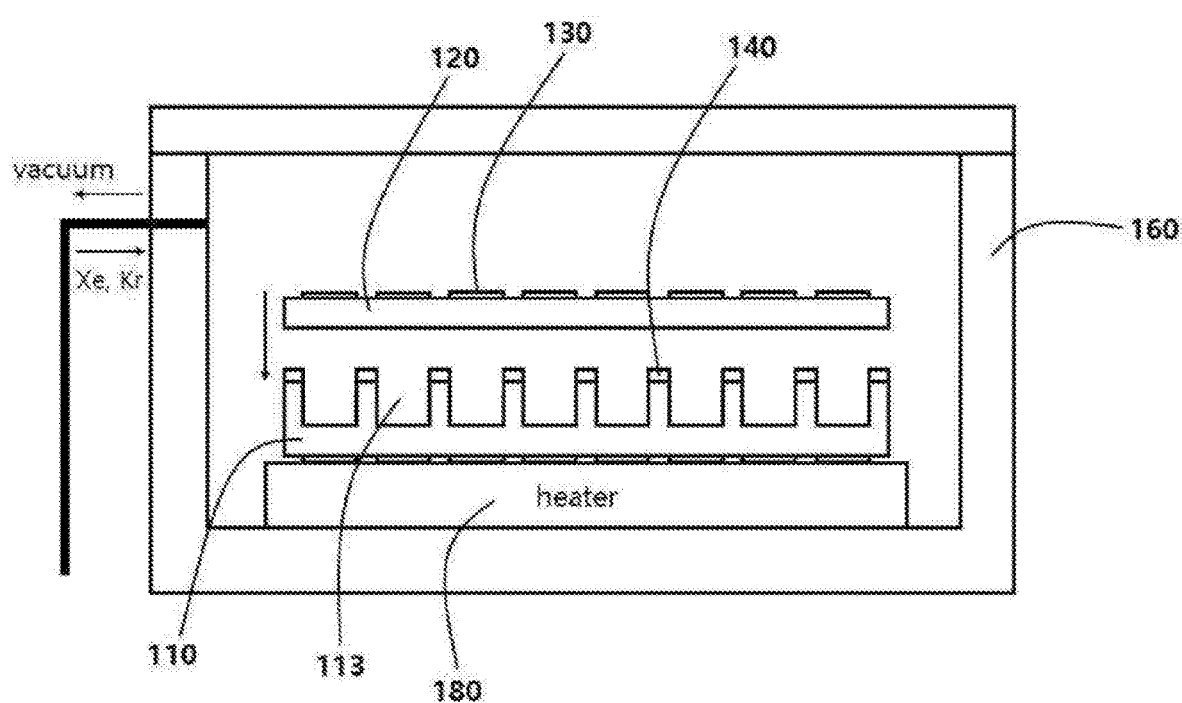
FIG. 5 is a view illustrating main parts of FIG. 4.

FIG. 4 is a view illustrating a method of manufacturing a flat type lamp for a photoionization detector according to the present disclosure and FIG. 5 is a view illustrating main parts of FIG. 4.

Referring FIGS. 4 and 5, a method of manufacturing a flat type lamp for a photoionization detector according to the embodiment includes: preparing the first and second plate members 110 and 120 (S10); forming the electrodes 130 on the first and second plate members 110 and 120 to face each other with the plurality of discharge cavities 111 therebetween (S20); forming the plurality of discharge cavities 111 on the first surface 110a of the first plate member 110 (S30); forming the sealing materials for sealing with the second plate member 120 on the first surface 110a of the first plate member 110 except for inner sides of the plurality of discharge cavities 111 (S40); putting and stacking the first and second plate members 110 and 120 in the chamber 160 having an internal space that can be selectively isolated from the outside (S50); isolating the internal space of the chamber 160 from the outside and evacuating the internal space (S60); making the internal space into a discharge gas atmosphere by supplying the discharge gas into the internal space (S70); and sealing the plurality of discharge cavities 111 from the outside by hardening the sealing materials 140 (S80).

In step S30, the plurality of discharge cavities 111, as described above, may be formed by forming grooves on the first surface 110a using chemical etching or physical etching such as sandblasting, or may be formed on the first surface 110a using spacers 113.

Accordingly, there is a discriminated feature in that there is no filling-injection pipe 150 shown in FIG. 3.

In this embodiment, the method includes making any one of the first and second plate members 110 and 120 function as a window that transmits vacuum ultraviolet produced in the plurality of discharge cavities 111 and forming a reflective layer that reflects the vacuum ultraviolet to the window on the other one (S31).

Further, in this embodiment, the method includes heating the first plate member 110 to remove impurities in the plurality of discharge cavities 111 (S32).

To this end, it is preferable that a heater 180 is disposed on the floor on which the first plate member 110 is loaded in the chamber 160.

Further, in this embodiment, the method includes cutting the first and second plate members 110 and 120 to include at least one of the plurality of discharge cavities 111 (S90).

This is the process for individualizing a lamp, which was described above.

According to the present disclosure, there is provided a flat type lamp structure in which a plurality of cells is integrated by filling a plurality of discharge cavities between first and second plate members having plate shapes with a discharge gas, so the size of the lamp can be freely changed and particularly there is an advantage in downsizing. Further, it is possible to massively produce lamps with a uniform characteristic.

Since a lamp is downsized, there is an advantage that it is possible to downsize a photoionization sensor that is applied to the lamp according to the present disclosure.

According to the present disclosure, since vacuum ultraviolet produced using a plurality of discharge cavities arranged in a plate shape is radiated, it is possible to improve sensitivity by increasing the ionization cross-sectional area of a measurement gas when the lamp is applied to a photoionization sensor.

What is claimed is:

1. A flat type lamp for a photoionization detector, the flat type lamp comprising:
    a first plate member having a plate shape and having a first surface on which a plurality of discharge cavities is formed;
    a second plate member isolating the plurality of discharge cavities from the outside by being disposed and sealed on the first surface of the first plate member;
    electrodes disposed on the first and second plate members and arranged to face each other; and
    a discharge gas filled in the plurality of discharge cavities and producing vacuum ultraviolet using electric force that is applied through the electrodes, wherein the discharge gas is filled into the plurality of discharge cavities simultaneously when the second plate member is bonded to the first plate member in a chamber isolated from the outside and filled with the discharge gas.

2. The flat type lamp of claim 1, wherein the plurality of discharge cavities is recessed in a thickness direction of the first plate member from the first surface of the first plate member.

3. The flat type lamp of claim 1, wherein the plurality of discharge cavities is formed by spacers bonded to the first surface of the first plate member and dividing the first surface into a plurality of regions.

4. The flat type lamp of claim 1, wherein the plurality of discharge cavities is sealed by the second plate member not to communicate with each other.

5. The flat type lamp of claim 1, wherein the first and second plate members are cut to include at least one of the plurality of discharge cavities.

6. A method of manufacturing a flat type lamp for a photoionization detector, the flat type lamp including a first plate member having a plate shape and a first surface, a second plate member, electrodes, and a discharge gas, the method comprising:
    forming the electrodes on the first and second plate members to face each other;
    forming a plurality of discharge cavities on the first surface of the first plate member and between the first and second plate members;

forming sealing materials for sealing with the second plate member on the first surface of the first plate member except for inner sides of the plurality of discharge cavities;

putting and stacking the first and second plate members in a chamber having an internal space that can be selectively isolated from the outside;

isolating the internal space of the chamber from the outside and evacuating the internal space;

making the internal space into a discharge gas atmosphere by supplying the discharge gas into the internal space and producing vacuum ultraviolet using electric force that is applied through the electrodes; and sealing the plurality of discharge cavities to isolate the plurality of discharge cavities from the outside by hardening the sealing materials.

7. The method of claim 6, further comprising making any one of the first and second plate members function as a window that transmits the vacuum ultraviolet produced in the plurality of discharge cavities and forming a reflective layer that reflects the vacuum ultraviolet to the window on the other one.

8. The method of claim 7, further comprising heating the first plate member to remove impurities in the plurality of discharge cavities.

9. The method of claim 7, further comprising cutting the first and second plate members to include at least one of the plurality of discharge cavities.

* * * * *